J. REINIG.
TEA-KETTLE.

No. 189,497.           Patented April 10, 1877.

Witnesses:           Inventor:

UNITED STATES PATENT OFFICE.

JOHN REINIG, OF FOND DU LAC, WISCONSIN.

IMPROVEMENT IN TEA-KETTLES.

Specification forming part of Letters Patent No. 189,497, dated April 10, 1877; application filed January 20, 1877.

*To all whom it may concern:*

Be it known that I, JOHN REINIG, of Fond du Lac, in the county of Fond du Lac and State of Wisconsin, have invented a new and useful Improvement in Tea-Kettles, which improvement is fully set forth in the following specification, reference being had to the accompanying drawings.

The object of my invention is to heat water, and, at the same time, condense the steam, prevent the steam from escaping by or through the cover, and protect the cover and rim of the kettle from rust and the inside of the kettle from corrosion, thereby keeping the water pure; and my invention consists of an improved double cover, A, for a tea-kettle, together with the rim B and condensing-tube C, connecting the breast of the kettle with the mouth of the spout.

Figure 1:
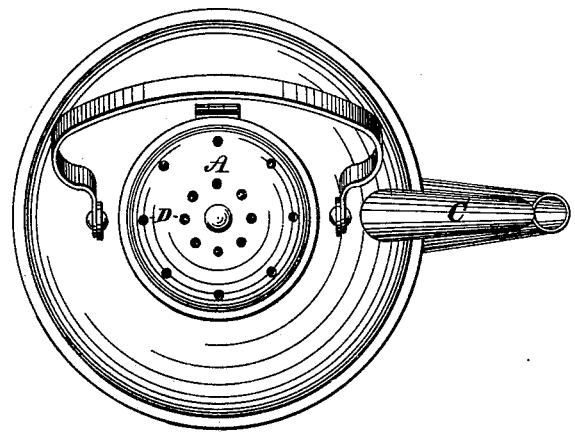
Figure 2:
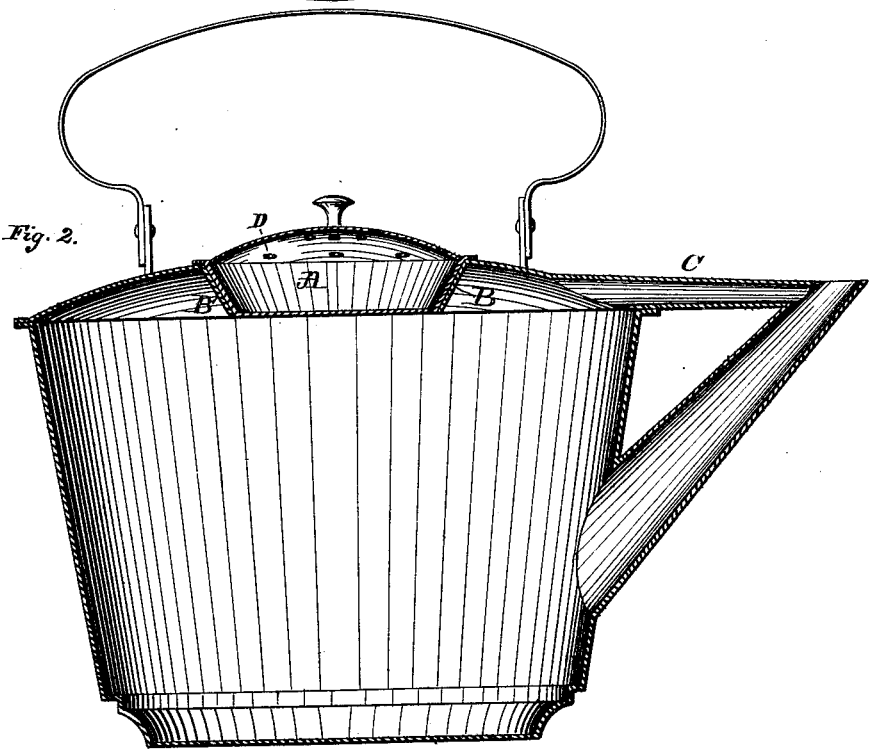

Figure 1 is a plan, and Fig. 2 a vertical section, of a tea-kettle constructed with my improvements.

The tea-kettle is like others in common use, and may be made of cast-iron or of sheet metal. The material used and form of the kettle is immaterial.

The cover A is double, with perforations D in the top. The bottom of the cover is smaller than the top, so that the cover forms an inverted frustum of a cone. The rim B of the kettle is made with a conical flange, corresponding to, and of the same inclination and width as, the sides of the cover. The cover A is hinged at one side to the kettle. The top or breast of the kettle is raised like a dome, and the rim B and cover A extend down into the kettle about as far as the base-line of the breast, where the breast joins the sides, and forms, in combination with the top, a complete steam-drum.

The condensing-tube C enters the kettle just above the base-line of the breast, and extends out horizontally to the end of the spout, and rests upon and is fastened to the spout, so that any water passing through the condensing-tube will pass back into the kettle by way of the spout. The tube C also forms a brace for the spout.

In the process of heating water, the steam collects in the steam-drum in the top of the kettle, formed by the top of the kettle and the depressed rim B, and, by reason of the double and perforated cover A, the steam is largely condensed, and that which is not condensed passes through the condensing-tube C, and either passes back into the kettle through the spout as condensed steam, or is permitted to escape, thus preventing the accumulation of sediment, the inside of the kettle from corroding, and the cover and rim from rusting, thereby keeping the water pure.

I claim as my invention—

1. The combination of the double cover A, perforated on the top, with the rim B, constructed in the manner set forth, so as to make a perfectly tight joint, substantially as described.

2. The condensing-tube C, combined with the top of the kettle and with the mouth of the spout, substantially as described, and for the purposes set forth.

3. A tea-kettle constructed with the rim B, cover A, and condensing-tube C, combined substantially as described, and for the purposes set forth.

JOHN REINIG.

Witnesses:
J. H. HOUSER,
D. H. SCOVILLE.